May 11, 1943. J. J. MEYER ET AL 2,318,877
QUILTING FRAME
Filed March 5, 1941 3 Sheets-Sheet 1

INVENTORS
JOSEPH J. MEYER +
FRANK A. JONES
BY
Wheeler, Wheeler & Wheeler
ATTORNEYS.

May 11, 1943.　　J. J. MEYER ET AL　　2,318,877
QUILTING FRAME
Filed March 5, 1941　　3 Sheets-Sheet 2

INVENTORS
JOSEPH J. MEYER +
FRANK A. JONES
BY Wheeler, Wheeler + Wheeler
ATTORNEYS May 11, 1943.  J. J. MEYER ET AL  2,318,877
QUILTING FRAME
Filed March 5, 1941   3 Sheets-Sheet 3

INVENTOR
JOSEPH J. MEYER &
FRANK A. JONES
BY
Wheeler, Wheeler & Wheeler
ATTORNEYS Patented May 11, 1943

2,318,877

UNITED STATES PATENT OFFICE 2,318,877

QUILTING FRAME

Joseph J. Meyer and Frank A. Jones, Milwaukee, Wis., assignors to G-H Specialty Company, Milwaukee, Wis., a corporation of Wisconsin Application March 5, 1941, Serial No. 381,806

8 Claims. (Cl. 45—24)

Our invention relates to improvements in quilting frames. The present application is a continuation in part of our prior application entitled Quilting frames and filed February 25, 1938, Ser. No. 192,590.

Objects of our invention are to provide improved means for rolling up the quilted margins as the work progresses; to provide improved means for adjusting the quilting frame with reference to the size of the quilt to be formed; to provide a knock-down quilting frame which can be readily separated into parts of short length to be encased and stored or transported in the form of a bundle; and in general, to provide a quilting frame of inexpensive construction, maximum strength for a given weight of material, and capability of adjustment with great facility to any desired position of use or storage.

Our invention relates particularly to quilting frames of the so-called "easel" type. It has features which are applicable to quilting frames designed to be mounted upon chairs or any other supporting devices.

In the drawings.

Like parts are identified by the same reference characters throughout the several views.

Figure 7:
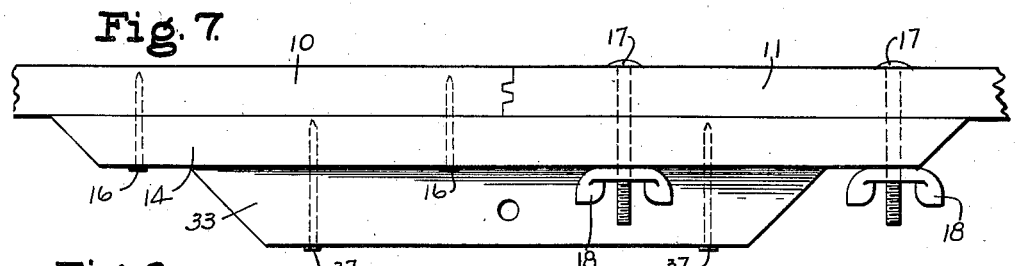
Figure 7 is a side elevation of the same.
Figure 8:
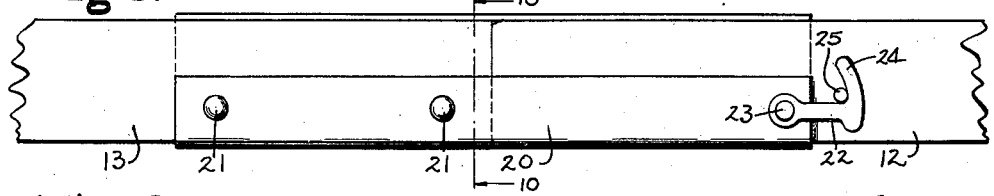
Figure 8 is a plan view of a central fragment of one of the cross bars.
Figure 9:
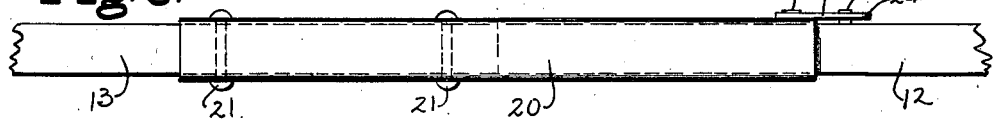
Figure 9 is a side view of the same.
Figure 10:
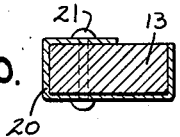
Figure 10 is a sectional view drawn to line 10—10 of Figure 8.

Our improved quilting frame preferably comprises two sets of side bar sections 10 and 11 and two sets of cross bar sections 12 and 13. The sections of each set are adjusted end to end and coupled to serve as a single or unitary bar. The sections 10 and 11 are connected or coupled by a splicing bar 14, permanently secured to the sections 10 by nails 16, and detachably secured to the sections 11 by bolts 17 and clamping thumb nuts 18 (Figure 7). The abutting extremities of the sections 10 and 11 are preferably provided with tongues and grooves, as shown in Figure 7.

Figure 1:
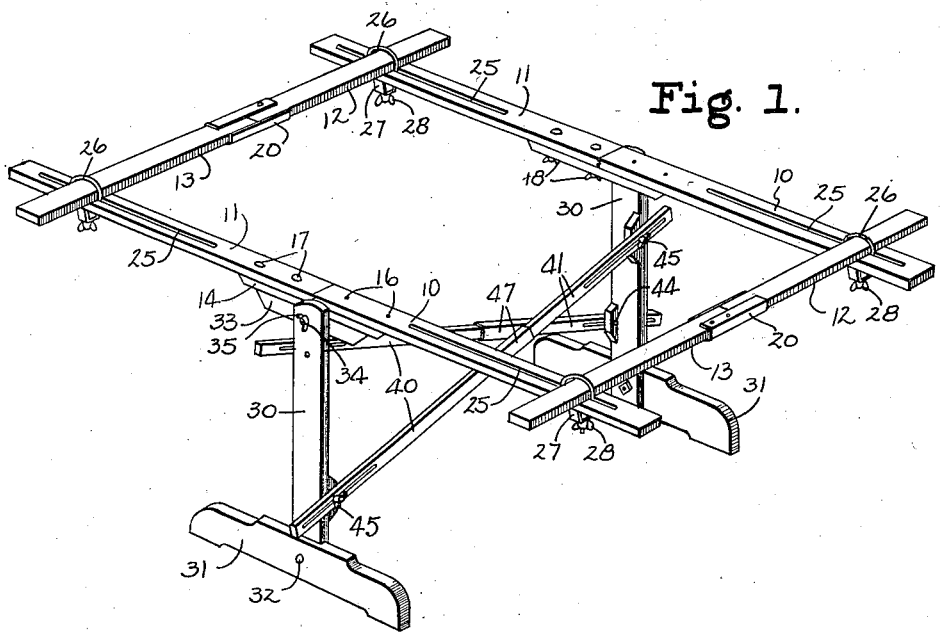
Figure 1 is a perspective view of a quilting frame of the easel type embodying our invention.

The sections 12 and 13 of each cross bar are similarly abutted end to end but are preferably encased on three sides, and partially on the fourth side, by a metal sheath 20. In the construction illustrated in Figure 1 this metal sheath is permanently secured at 21 to the bar 13, and detachably connected with the bar 12 by an oscillatory cam 22, pivoted to the sheath at 23, and having a hook-shaped cam arm 24 engageable with a stud 25 on the bar section 12, the hook-shaped arm 24 being adapted to engage said stud and draw the bar 12 into forcible end to end engagement with the abutted end of the bar 13.

The sheath 20 is partially open on the upper side to allow the quilt covers to be tacked to the wooden bar sections.

Figure 2:
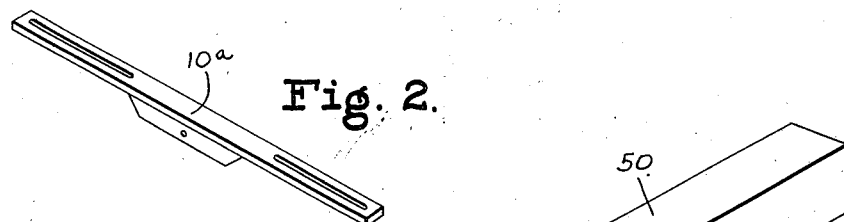
Figure 2 is a detail view of one of the substitute side bars to be employed for supporting small quilts.

For large quilting frames the side bars and end bars are made in sections of nearly equal length to facilitate bundling and storing the sections when the frame is not in use. For smaller frames, unitary bars may be employed. For example, in Figure 2 we have shown a side bar comprising a single section 10a.

Figure 4:
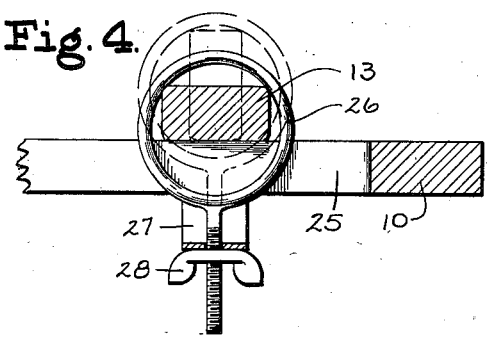
Figure 4 is a detail view of one of the cross bar clamps, with associated parts of the frame shown in section.
Figure 5:
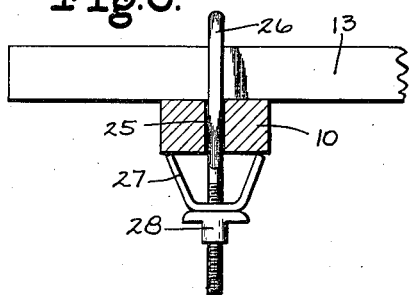
Figure 5 is a view of the same, taken at right angles to Figure 4.
Figure 6:
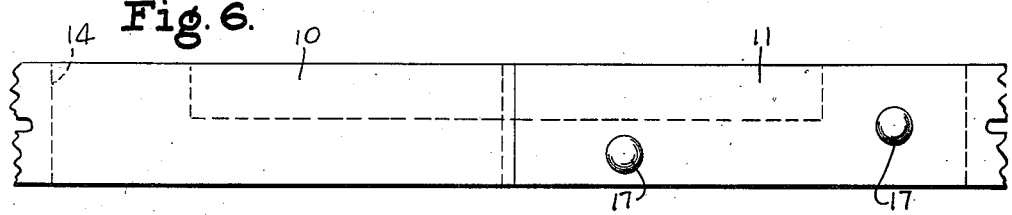
Figure 6 is a plan view of a central fragment of one of the side bars.

The outer ends of the side bars are provided with longitudinally extending slots 25, in which rings 26 are adjustably mounted for movement either longitudinally of the slots or vertically through the slots. These rings 26 are large enough to receive the ends of the cross bars, and when the cross bars are adjusted, with their ends extending through these rings, they can be clamped to the side bars by drawing the rings downwardly. Each ring has a depending screwthreaded shank, as best shown in Figures 4 and 5.

Each ring has its shank passed through U-shaped bracket 27 and provided with a thumb nut 28. Each bracket 27 is adapted to engage the under surface of one of the side bars or side bar sections, whereupon the thumb nut may be utilized to draw the associated ring 26 downwardly through the slot 25, thereby clampingly securing the cross bar to the upper surface of the side bar or side bar section.

In operation, the quilt, or quilt covers, are tacked to the cross bars in the usual manner, but when either end portion of the quilt is to be rolled up, the thumb nuts 28 are loosened to allow the rings 26 to be lifted until the cross bar can be rotated in the ring to wind up the quilt. During such rotation the associated rings will travel inwardly in the respective side bar slots in correspondence with the reduced length of the exposed portion of the quilt.

The side bars and cross bars are provided with opposite flat sides and when the frame is assembled portions of the bottom flat side of each end bar are clamped into contiguous engagement with portions of the flat top side of each side bar, whereby to provide strong joints capable of withstanding the torsional stresses to which the device is subjected.

The above described quilting frame may be mounted upon any suitable support, but we preferably provide supporting easels, thus making it unnecessary to support the frame upon chairs or other improvised supporting members. Each easel comprises a standard 30, to which a foot piece 31 is bolted, as indicated at 32. The upper end of each standard 30 carries a mounting bar 33, centrally connected with the standard by a bolt 34 and thumb nut 35, whereby the mounting may be adjusted horizontally or tilted to any desired inclination.

Each mounting bar 33 may be secured to its associated splicing bar 14 by nails or screws 37, whereby the mounting bar and the splicing bar to which it is secured may be permanently connected with one of the side bar sections 10, and detachably connected with the abutted section 11.

The standards are connected with each other by oppositely inclined braces, which may also be formed in sections 40 and 41, which abut each other at their meeting ends and may be encased in a metallic sheath 47, suitably apertured to receive the coupling bolts 44. These bolts have clamping thumb nuts 45.

Figure 3:
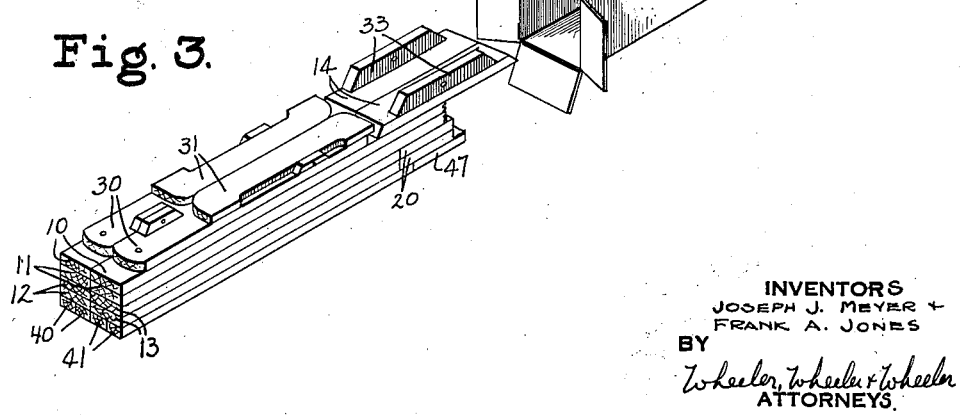
Figure 3 is a view of the quilting frame shown in Figure 1 when stacked for storage purposes, the bundle of parts being ready for insertion in a suitable container.

By forming the side bars, cross bars and braces in sections of suitable cross sectional dimensions, we are able to provide a knock-down, easel supported, quilting frame which can be taken apart and stored in a comparatively small space, preferably in a bag or other suitable container. The brace sections and the cross bar section may be of substantially the same length, and the brace sections may be approximately half the width of the cross bar sections. Therefore, the four brace sections 40 and 41 may be placed side by side, as shown in Figure 3, and each pair of brace sections may receive a cross bar section 12 and a superposed cross bar section 13. The side bar sections 11 may then be placed upon the sections 13, whereupon the side bar sections 10 may be laid upon the sections 11, with the splicing members 14 and mounting pieces 33 uppermost.

The standards 30 will be received between the splicing members 14 and the other end portions of the sections 10, and upon the top of the pile thus formed the foot pieces 31 may be placed, as shown in Figure 3, thus making a rectangular pile of flat bars. The lower bars of this pile may be of substantially equal length. Except for the extended portions of the splicing members 14, the upper bars in the pile are of substantially the same length as the lower ones, and therefore all portions of the disassembled quilting frame may be readily inserted in a bag or container 50 and transported as a knock-down assembly.

Figure 11:
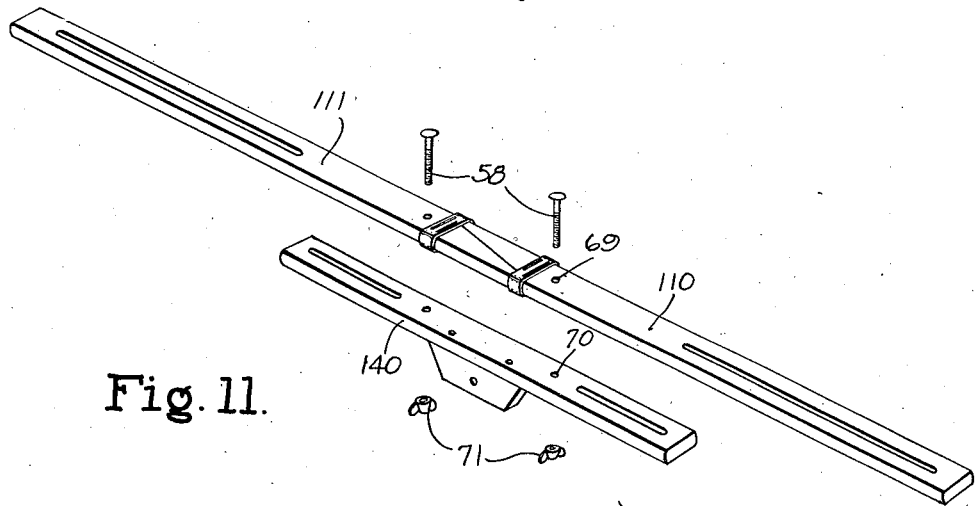
Figure 11 is a perspective view of a substitute side bar provided with an improved scarf joint.
Figure 12:
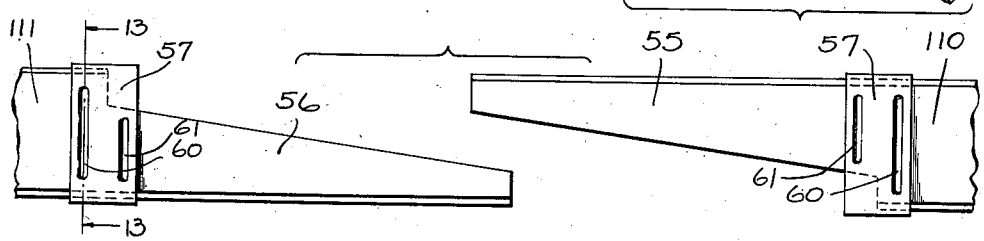
Figure 12 is an enlarged fragmentary plan view of the improved scarf joint portion shown in Figure 11.

Figures 11 and 12 show a side bar which may be substituted for the above described side bars. The sections 110 and 111 of each side bar are adapted for end to end coupling by the provision at their respective joining ends 55 and 56 of chamfered portions each terminating at a shoulder, as best shown in Figure 12, to adapt them for complementary engagement to provide a scarf joint, whereby the sections are rigidly secured together and to a splicing member 140 to provide a unitary bar assembly. An enclosure sheath 57 is clampingly engaged to each section in the position whereby substantially one-half of the sheath extends beyond the shoulder over the chamfered portion of the section. The top and bottom walls of each sheath are indented to provide inwardly directed ribs 60 which preferably extend a substantial portion of the width of the section to which the sheath is clamped. Similar ribs 61 are provided in the top and bottom walls of the sheath respectively in spaced relation to ribs 60, the ribs 61 being somewhat shorter than ribs 60 to extend substantially the width of the reduced chamfered portions of the sections.

Figure 13:
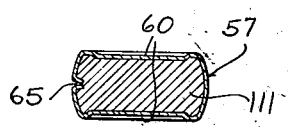
Figure 13 is a section taken along line 13—13 of Figure 12.
Figure 14:
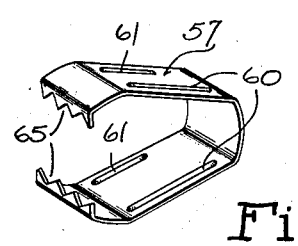
Figure 14 is a view in perspective of an open clamp sheath of the type used in the joint shown in Figures 11, 12 and 13.

Each clamp is provided with serrated end portions 65, and when the clamps are applied to the sections under pressure, the teeth 65 are embedded in the side of the wooden bar as shown in Figure 13, the ribs 60 and 61 being likewise embedded in the top and bottom walls of the bar. The pairs of ribs are preferably opposite each other when the sheath is clamped to its respective wooden section. The clamping operation is preferably effected with sufficient power to ensure permanent anchorage of the sheath to its section.

When the sections are joined end to end, the sheaths permit axial movement to and from engagement but prohibit all other relative movement. A pair of bolts 58 serves the dual function of clamping each side bar to its associated splicing bar and to prohibit axial separating movement of the side bar sections 110 and 111. The bolts project through suitable aligned bores 69 and 70 provided in each section and in the splicing bar 140, respectively, the assembly being maintained under clamping pressure by means of wing nuts 71. Obviously dis-assembly is easily effected by removal of the wing nuts, withdrawal of the bolts, and separation of the side bar sections by axial withdrawal thereof. This construction produces a strong joint while necessitating the employment of only two bolts which have no function except to secure the sections to the splicing bar and to hold them against separation. All lateral or torsional strains are absorbed in the external bands 57, with the result that splitting of the sections through the bolt bores as the result of rough usage is substantially eliminated.

Figure 15:
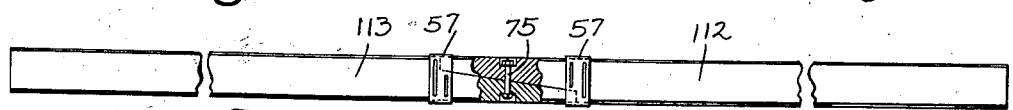
Figure 15 is a plan view of an alternate scarf joint connection applied to the cross bar of the device.

Figure 15 illustrates an alternate joint construction as applied to a cross bar. In this embodiment sections 112 and 113 are provided with a scarf joint and clamping sheaths as above described. Preferably a single bolt 75 projects through the joined portions of the bar sections to maintain the chamfered portions thereof in clamping engagement. The termini of bolt 75 are preferably countersunk, as shown.

Figure 16:
Figure 16 is a side elevation of a substitute cross brace provided with an alternate type of scarf joint.

Figure 16 illustrates a cross brace provided with a somewhat different type of scarf joint, the chamfered portions of the bar sections 140 and 141 being clampingly engaged by a pair of bolts 76 which extend therethrough.

Packaging of the frame portions in knockdown form as heretofore described may be accomplished with any of the alternate side bars, end bars, or cross bars described, but the constructions shown in Figures 11 to 15 are preferred, in that the sheath fitting on the end of each section provides a socket in which the end of the other section is tightly held, and is secured without bolts or the like against all relative movement except that required for the separation of the sections.

We claim:

1. The combination with a set of easel standards of bracing bars formed in detachable sections, and adjustably connected to the standards to support the standards at different distances from each other, quilting frame side bars also formed in sections normally connected with each other end to end and pivotally connected with the respective standards, a set of cross bars detachably connected with the end portions of the side bars and adjustable longitudinally thereof, said cross bars being also formed in sections the cross bar sections being of a length nearly equal to that of the side bar sections, and the lengths and widths of the brace bar sections, cross bar sections, side bar sections and standards adapting them for superposed storage in a rectangular pile of a length substantially equal to that of any one of the bar sections.

2. A quilting frame comprising the combination of a set of easel standards, oppositely inclined bracing bars each extending from the upper portion of one of the standards to the lower portion of the other and each formed in detachable sections, manually operable clamping connections for adjustably securing the bracing bars to the respective standards at various points along the length of the bars to determine the spacing of the standards, quilting frame side bars also formed in sections, mounting bars for the abutting ends of the side bar sections, said mounting bars having clamping pivotal connection with the respective standards, quilting frame cross bars also formed in sections, coupling means for detachably connecting the cross bars with the side bars in various positions along the end portions of each, said cross bar sections, side bar sections, brace bar sections and standards each having a length and width adapting them for superposed storage in a rectangular pile of a length substantially equal to that of any one of the bar sections.

3. A quilting frame having flat side bars formed in detachable sections, coupling means for connecting the sections end to end in butted pairs, the outer ends of the side bars being longitudinally slotted, means supporting said side bars and disposed intermediate their slotted ends, clamping rings movably mounted in the side bar slots in spaced relation to the supporting means, cross bars detachably engaged in said rings, and clamping devices for drawing said rings into their associated slots, the cross bars and side bars having opposed flat surfaces adapted to be drawn into non-rotatable and binding engagement with each other by said clamping devices and the cross bars being rotatable when the clamping pressure is relieved sufficiently to allow the rings to be lifted above the side bars.

4. A quilting frame having side bars rectangular in cross section and formed in detachable sections, coupling means for connecting the sections end to end in butted pairs, the outer ends of the side bars being longitudinally slotted, means supporting said side bars and disposed intermediate their slotted ends, clamping rings movably mounted in the side bar slots in spaced relation to the supporting means, and cross bars each provided with a flat side and detachably engaged in said rings and rotatable in the rings when the latter are in bar releasing position, each clamping ring being provided with depending means engageable with the side bar and manually operable for drawing the ring downwardly in the slot to clamp the cross and side bars together with the flat side of the cross bar held to the side bars whereby the cross bars may be securely held against rotation.

5. In a quilting frame, the combination with a support, of longitudinally slotted side bars mounted on the support and having cross bar receiving rings mounted in the slots and provided with depending shanks, cross bars, rectangular in cross section, and having a width substantially equal to the internal diameter of the rings, clamping means for drawing said shanks and rings downwardly through the slots to cross bar clamping position, said cross bars being rotatable in the rings when the clamping means is retracted sufficiently to allow the major portions of the rings to be lifted above the side bars and each cross bar being non-rotatable in its respective rings when a sufficient portion of at least one of such rings is drawn into its aforesaid slot to reduce the exposed opening through the ring to a cross section less than that required to permit the rectangular cross section of the associated cross bar to turn in the ring upon the slotted side wall.

6. A knock-down pedestal quilting frame, comprising, as separate elements, a pair of easel standards, a detachable foot piece for each member, a pair of brace bar sections detachably and adjustably connected with opposite ends of the respective easel standards, two pairs of side bar sections connected end to end, mounting pieces spanning the abutting ends of the side bar sections and pivotally connected with the respective easel standards, two pairs of cross bar sections connected end to end and adjustably connected with the outer end portions of the side bar sections, said elements being adapted when separated to be packaged, with the brace bar sections disposed side by side, and the sections of each of the other paired elements being superposed in two piles upon the brace bars.

7. In a quilting frame, the combination with a pair of easel standards and a pair of cross braces adjustably connecting an upper portion of each standard to the lower portion of the other standard, of mounting members pivoted to the respective standards in substantial parallelism with each other, clamping means for holding said members in pivotal adjustment, a sectional easel frame having side bars each of which comprises separable end sections and means connecting said sections to the respective mounting members, said connecting means being detachable as to at least one of said separable end sections, whereby said mounting members not only adjustably support the frame as a whole but also provide splicing connections between the respective sections of the frame side bars.

8. A quilting frame, comprising the combination of a set of easel standards provided with detachable foot pieces, a set of bracing bars formed in detachable sections adjustably connected with the upper and lower end portions of the standards in crossed relation to each other, quilting frame side bars also formed in sections in axial alignment, means fixing the side bar sections in alignment, a set of mounting bars, each pivotally connected with one of the standards in supporting relation to the meeting end portions of an associated side bar, splicing bars interposed between the meeting end portions of the sections comprising each of the side bars and its associated mounting bar, the means fixing the side bar sections in alignment including means connecting together the mounting bar, splicing bar and respective side bar sections, and a set of cross bars detachably connected with the end portions of the side bars and adjustable to various positions of longitudinal and transverse adjustment thereon.

JOSEPH J. MEYER.
FRANK A. JONES.